United States Patent [19]

Mortimer et al.

[11] 4,456,104

[45] Jun. 26, 1984

[54] HYDRAULIC ACTUATOR FOR A VEHICLE INTERNAL SHOE-DRUM BRAKE

[75] Inventors: Ivan Mortimer; Glyn P. R. Farr, both of Warwickshire; Alfred Yardley, Worcestershire, all of England

[73] Assignee: Lucas Industries Limited, Birmingham, England

[21] Appl. No.: 294,439

[22] Filed: Aug. 20, 1981

[30] Foreign Application Priority Data

Aug. 23, 1980 [GB] United Kingdom ................ 8027508

[51] Int. Cl.³ ............................................. F16F 65/24
[52] U.S. Cl. .................................... 188/349; 303/6 C
[58] Field of Search ............... 188/349, 363; 303/6 C, 303/6 R, 113, 115, 117

[56] References Cited

U.S. PATENT DOCUMENTS 4,266,640 5/1981 Woo .................................. 188/349

Primary Examiner—Duane A. Reger
Attorney, Agent, or Firm—Scrivener, Clarke, Scrivener and Johnson

[57] ABSTRACT

An hydraulic brake actuator comprises opposed pistons which work in bore portions in a housing and fluid pressure in a pressure chamber urges the pistons in opposite directions to separate adjacent ends of a pair of brake shoes. A pressure proportioning valve controls communication between pressure spaces constituted by the pressure chamber. The valve is normally open to equalize the pressure in the pressure spaces but closes at a predetermined pressure so that any further increase in pressure is operative in only one pressure space, the pressure in which space acting to keep the valve closed. In use in a brake of the one-leading one-trailing shoe-drum type the increased pressure acts on the piston which applies the trailing shoe to the drum, in order to equalize the torque.

4 Claims, 6 Drawing Figures

HYDRAULIC ACTUATOR FOR A VEHICLE INTERNAL SHOE-DRUM BRAKE

SPECIFIC DESCRIPTION

This invention relates to an hydraulic actuator for a vehicle internal shoe-drum brake of the kind in which fluid in a pressure chamber acts between relatively movable parts of a piston and cylinder assembly to separate adjacent ends of a pair of brake shoes and urge friction linings carried by the shoes into engagement with a rotatable drum.

In vehicle hydraulic braking systems it is known to provide a pressure proportioning valve which modifies the hydraulic pressure applied to brakes on the rear wheels to maintain the correct ratio of braking effort of brakes on the front wheel to the brakes on the rear wheels during severe braking. In known constructions the valve is located in the line to the rear wheel brakes, but this involves an extra component which increases the initial expense and the cost of maintenance.

In a different known construction, a pressure proportioning valve is incorporated in an hydraulic actuator of the kind set forth to control communication between pressure spaces constituted by the pressure chamber with each piston subjected to pressure in one respective pressure space. The valve is normally open to equalise the pressure in the pressure spaces, and the valve closes at a first predetermined pressure to cutoff the fluid supply to one pressure space, so that further increase in pressure is operative only in the other pressure pressure space, which reduces the torque generated by the brake. At a second predetermined pressure the valve opens again, and thereafter acts to maintain a constant pressure differential between the two pressure spaces. This has the advantage of incorporating the valve in the actuator, and also makes it possible for normal forward rotation of a wheel to apply more pressure to the trailing shoe than to the leading shoe, in a brake of the one-leading one-trailing shoe type which normally constitutes the brakes on a rear wheel of a vehicle. This tends to equalise the torque generated by the shoes, but has the disadvantage that the valve has to be relatively complex to operate in this way. In consequence the valve requires a relatively large amount of space in the actuator which has the effect of increasing substantially the axial length of the actuator with the necessity of having to provide an equivalent increase in available space in the critical region of the shoe-ends.

According to our invention, an hydraulic actuator of the kind set forth incorporates a pressure proportioning valve for controlling communication between pressure spaces constituted by the pressure chamber of the actuator, the valve being normally open to equalise the pressure in the pressure spaces and being adapted to close when a predetermined pressure is reached so that further increase in pressure is operative in only one pressure space, the pressure in that pressure space acting to keep the valve closed.

Thus the construction of the valve is simplified since it is repsonsive to only one predetermined pressure rather than two, and so requires less space in the actuator.

Preferably the valve is arranged so that, when closed, the increased pressure is operative to act on the one relatively movable part which applies the trailing shoe in a brake of the one-leading one-trailing shoe type, in order to equalise the torque.

Conveniently the valve comprises a head for engagement with a seating surrounding an opening in a partition which separates the pressure spaces from each other, the head being carried by a stem which works in a longitudinal bore in the one piston on the opposite side of the partition from the seating, and a compression spring acts between the head and the partition normally to urge the head away from the seating.

Preferably the spring is housed within a bore in the other piston, and the spring abuts at its outer end against an abutment on an extension which projects into that bore. Thus the valve can be installed in an existing actuator wihout increasing its overall length substantially.

Constructing the partition as a separate member, which can be inserted into the housing through the outer end of the bore in which said one piston works, facilitates assembly, particularly since the valve is otherwise carried by the said one piston only by the sealed engagement of the stem in the bore, being entirely separate from the other piston which acts on the leading shoe.

The force in the spring determines the pressure at which the valve closes against the spring force.

According to another aspect of our invention we provide an internal shoe-drum brake of the one-leading one-trailing shoe type in which adjacent shoe ends are adapted to be separated by an actuator as described above.

Some embodiments of our invention are illustrated in the accompanying drawings in which.

Figure 1:
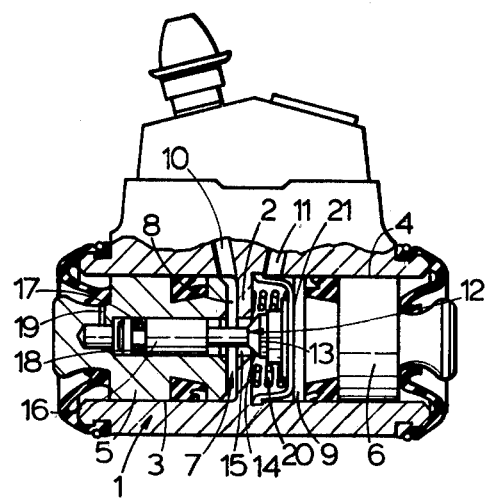
FIG. 1 is a longitudinal section through an hydraulic brake actuator incorporating a pressure proportioning valve.

The actuator shown in FIG. 1 of the drawings comprises a housing 1 which is adapted to be mounted on the back plate of a brake of the internal shoe-drum type between adjacent of pairs of leading and trailing shoes (not shown). The brake is used for braking a rear wheel of a vehicle. The shoes carry friction linings for engagement with a rotatable drum and at their nonactuated ends abut against fixed abutment surfaces on the back plate.

The housing 1 is provided on opposite sides of a central partition 2 with opposed bores 3 and 4 in which are work opposed pistons 5 and 6. The partition 2 divides a pressure chamber 7 in the housing 1 into separate pressure spaces 8 and 9 which are defined between the partition 2 and the respective pistons 5 and 6.

The pressure chamber 7 is connected to a supply passage 10 for connection to a brake-applying hydraulic master cylinder for pressure fluid, and a bleed passage 11 leads from the pressure space 9 for system bleeding purposes.

Communication between the pressure spaces 8 and 9 is controlled by a pressure proportioning valve generally indicated by 12. As illustrated the pressure proportioning valve 12 comprises a head 13 for engagement with a seating 14 on the side of the partition 2 which is adjacent to the piston 6 and which surrounds an opening 15 in the partition normally providing communication between the pressure spaces 8 and 9. The head 13 is carried by a stem 16 having a reduced diameter portion which projects through the opening 15 and a portion of increased diameter which works in a longitudinally extending bore 17 in the piston 5 which acts on the end of the trailing shoe. The stem 16 carries a seal 18 which has a sliding sealing engagement in the bore 17, and the free outer end of the stem 16 is exposed to atmospheric pressure through a radial vent 19 in the piston 5. A compression spring 20 housed in the pressure space 9 acts between the head 13 and the partition 2 normally to urge the head away from the seating and into an open position in engagement with an apertured stop member 21 of dished outline.

When the brake is to be applied, normally fluid under pressure from the master cylinder is admitted to the pressure chamber 7 to urge the pistons 5 and 6 in opposite directions to separate the shoe ends thereby applying the leading and trailing shoes to the drum.

The head 13 is held away from the seating 14 by the spring 20 until the pressure in the pressure chamber 7 acting on the pistons 5 and 6 and the stem 16 attains a value, say 30 bar, to generate a force sufficient to overcome the force in the spring. At this point the head 13 engages with the seating 14 to close the valve 12 and isolate the pressure space 8 from the pressure space 9. Thereafter any increase in master cylinder pressure can only be applied to the piston 5 which acts on the trailing shoe and the valve 12 will not open again until the master cylinder pressure is reduced. Closure of the valve 12 has the effect of increasing the force of the trailing shoe and its contribution to the braking effort to equalise substantially the braking effects of the two shoes leading to more equal wear of the linings of the shoes.

Figure 2:
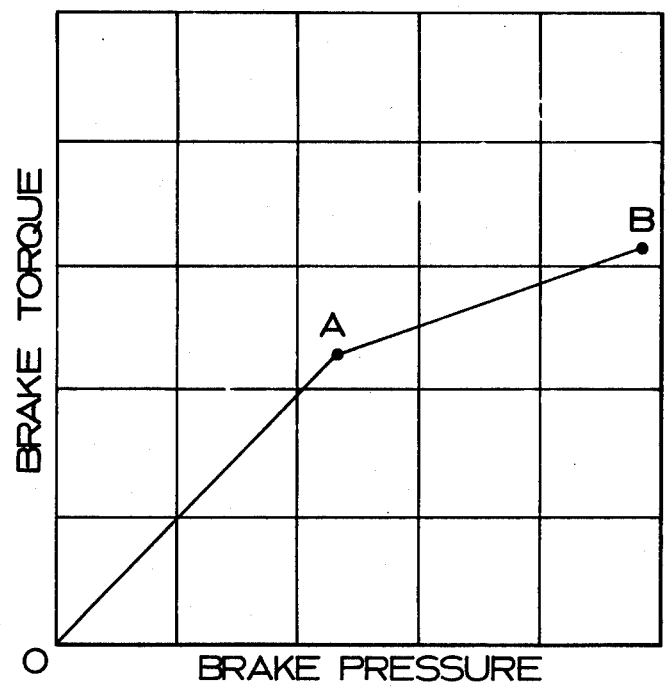
FIG. 2 is a graph of brake torque against brake pressure.

The effect of the valve 12 is shown in the graph of FIG. 2 from which it will be seen that between 0 and A both pistons 5 and 6 are applied and between A and B only the trailing shoe is applied.

Figure 3:
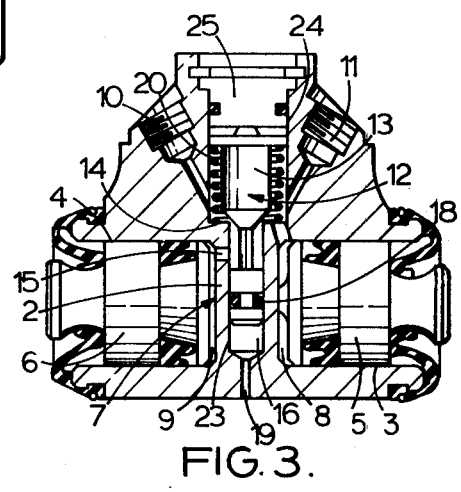
FIG. 3 is an actuator similar to FIG. 1 but incorporating a modified proportioning valve.

In the modified actuator of FIG. 3 the valve 12 is located in a transverse bore in the housing. The bore has a larger diameter portion 24, the outer end of which is closed by a plug 25. The valve head 13 is located in the portion 24 while the valve stem 16 works in a smaller diameter bore portion 23 in the partition 2. The valve seating 14 is formed by the step in diameter between the portions 23 and 24, and the spring 20 acts between the seating 14 and the head 13. The supply passage 10 leads to the bore portion 24. The pressure space 8 communicates with the pressure space 9 through an inclined passage, bore portion 24, valve 12, bore portion 23 and opening 15, which is disposed in the partition 2 between the head 13 and the portion of the stem 16 which is of increased diameter.

The construction and operation of the actuator of FIG. 3 is otherwise the same as that of FIG. 1 and corresponding reference numerals have been applied to corresponding parts.

In the construction of FIGS. 1 and 3 the partitions are integral with the housing 1 which requires a special housing to be provided.

In the actuators of FIGS. 4 to 7 the partitions comprise separate members, each comprising a sleeve 30.

Figure 4:
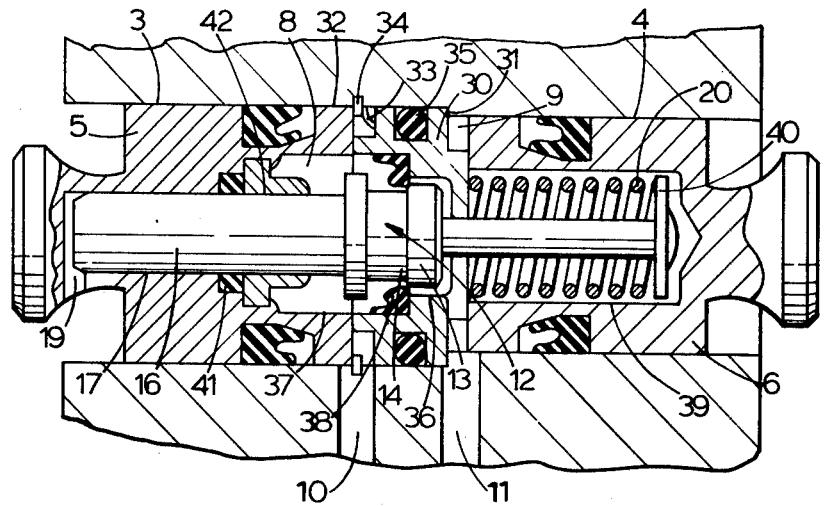
FIG. 4 is a longitudinal section through another hydraulic actuator incorporating another pressure proportioning valve.

In the actuator illustrated in FIG. 4 the sleeve 30 is held against a slight shoulder 31 at a step in diameter in a bore 32 which passes through the housing 1 by means of a Belleville or other spring washer 33 acting between the sleeve 30 and a circlip 34. The sleeve 30 has a radial groove which receives an 'O' ring seal 35 for sealing engagement with the wall of the bore 32.

The inner face of the sleeve 30 surrounding the opening 15 is provided with two stepped bore portions 36 and 37 at different diameters of which the diameters increase towards the piston 5. An annular seal 38 of elastomeric material is housed on the portion 37 against a shoulder between the portion 38 and 37. The seal 38 constitutes the seating 14 and normally the head 13 is held away from it by the spring 20.

The piston 6 is provided with a blind bore 39 which is open at its inner end and accommodates the spring 20 which surrounds an extension on the side of the head 14 opposite the stem 16 and of which the free end carries a radial abutment 40 for the end of the spring 20 remote from the sleeve 30.

Finally the stem 16 is of a constant diameter throughout its axial length and works through a seal 41 which is retained in the bore 17 by a retainer 42.

This construction is more compact than those described above since the spring 20 in its maximum extended condition is disposed wholly within the length of the piston 6. Assembly is facilitated since the valve 12 is entirely separate from the piston 6, being connected only to the piston 5 by the co-operation of the stem 16 with the seal 41. In fact, with or without the piston 5, the valve 12 is installed with the sleeve 30, as the sleeve 30 is installed in the bore 32.

The construction and operation of the actuator of FIG. 4 is otherwise the same as that of FIG. 1 and corresponding reference numerals have been applied to corresponding parts.

Figure 5:
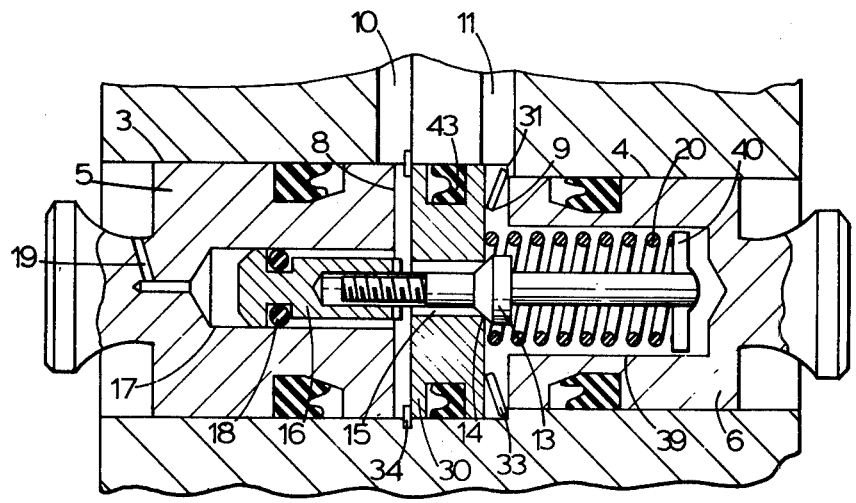
FIG. 5 is a view similar to FIG. 4 but showing a modified actuator.

In the actuator of FIG. 5 the washer 33 acts between the sleeve 30 and the shoulder 31 to hold the sleeve 30 against the circlip 34 and the 'O' ring seal is replaced by a seal 43 of cup-shaped section. As in the construction of FIG. 1, the seating 14 surrounds the opening 15 and the stem 16 carries the seal 18 which has a sliding sealing engagement in the bore 17, so that the retainer 42 is omitted.

In the actuator of FIG. 6 the washer 33 again acts on the circlip 34 to hold the sleeve 30 against the shoulder 31.

Figure 6:
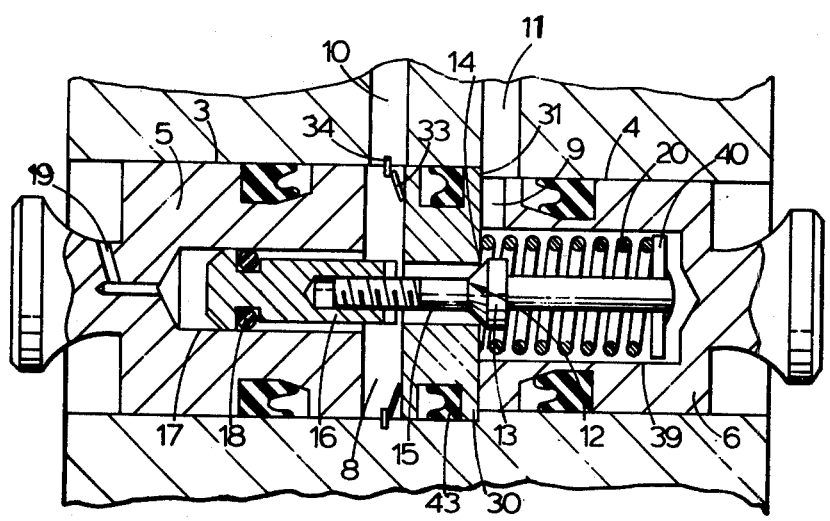
FIG. 6 is a view similar to FIG. 4 but showing a further modified actuator.

The construction and operation of FIGS. 5 and 6 are otherwise the same as that of FIG. 4, and corresponding reference numerals have been applied to corresponding parts.

The constructions of actuator described above, and in particular those of FIGS. 4 to 6, are of designs lending themselves to mass-production technique. Tolerance variations are not critical, and it is only important to ensure that the limits are such that the valve 12 is open in an inoperative position of the actuator.

We claim:

1. An hydraulic actuator for a vehicle internal shoe-drum brake, said actuator comprising a piston and cylinder assembly having relatively movable parts, said assembly comprising a housing, means defining a cylinder bore in said housing, pistons working in said bore, and means defining pressure spaces in said housing, fluid in said pressure spaces acting on respective pistons in order to apply said brake, and said actuator incorporating a pressure proportioning valve for controlling communication between said pressure spaces, said valve being normally open to equalise the pressure in said pressure spaces and said valve being adapted to close when a predetermined pressure is reached so that further increase in pressure is operative in only one said pressure space, the pressure in the one said pressure space acting to keep said valve closed, said assembly being provided with a partition in said bore to separate said pressure spaces from each other, said partition having an opening, and said valve comprises a head for engagement with a seating surrounding said opening and a stem carrying said head, means defining a longitudinal bore in said piston on the opposite side of said partition from said seating, said stem working in said longitudinal bore and a compression spring acting between said head and said partition to urge said head away from said seating.

2. An actuator as claimed in claim 1, wherein said spring is housed within a bore in the other said piston, and said spring abuts at its outer end against an abutment on an extension which projects into that said bore.

3. An actuator as claimed in claim 1, wherein said partition comprises a separate member which is adapted to be inserted into said housing through the outer end of said bore in which the said one piston works, and said valve is carried by the said one piston by the sealed engagement of said stem in said longitudinal bore, said valve being entirely separate from the other said piston.

4. An actuator as claimed in claim 1, wherein the force in the spring determines the pressure at which said valve closes against the spring force.

* * * * *